(12) United States Patent
Jo et al.

(10) Patent No.: US 9,436,326 B2
(45) Date of Patent: Sep. 6, 2016

(54) TOUCHSCREEN DEVICE AND METHOD FOR CONTROLLING THE SAME

(71) Applicant: SAMSUNG ELECTRO-MECHANICS CO., LTD., Suwon-Si, Gyeonggi-Do (KR)

(72) Inventors: Byeong Hak Jo, Suwon-si (KR); Moon Suk Jeong, Suwon-si (KR); Yong il Kwon, Suwon-si (KR); Tah Joon Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 80 days.

(21) Appl. No.: 14/229,025

(22) Filed: Mar. 28, 2014

(65) Prior Publication Data

US 2015/0193042 A1    Jul. 9, 2015

(30) Foreign Application Priority Data

Jan. 3, 2014  (KR) .......................... 10-2014-0000639

(51) Int. Cl.
*G06F 3/044* (2006.01)
*G06F 3/041* (2006.01)

(52) U.S. Cl.
CPC ............. *G06F 3/044* (2013.01); *G06F 3/0418* (2013.01)

(58) Field of Classification Search
CPC ............................ G06F 3/0418; G06F 3/044

USPC ......................................................... 345/174
See application file for complete search history.

(56) References Cited

U.S. PATENT DOCUMENTS

| 2009/0009486 | A1* | 1/2009 | Sato ..................... G02F 1/13338 345/174 |
| 2011/0109585 | A1* | 5/2011 | Kwon ..................... G06F 3/0418 345/174 |
| 2011/0227864 | A1* | 9/2011 | Baek ..................... G06F 3/0418 345/174 |
| 2012/0056663 | A1* | 3/2012 | Oh ........................ G06F 3/0412 327/517 |

FOREIGN PATENT DOCUMENTS

KR    10-2011-0105045 A    9/2011

* cited by examiner

*Primary Examiner* — Ariel Balaoing
(74) *Attorney, Agent, or Firm* — NSIP Law

(57) ABSTRACT

A touchscreen device may include: a panel unit, a driving circuit unit, a sensing circuit unit and a control unit. The control unit may apply a driving signal to a first node capacitor formed at an intersection between a first and a first one of the plurality of sensing electrodes and calibrate gains of the plurality of converter circuit units. Each of the plurality of panel deviation calibration units may calibrate an output signal from the respective one of the plurality of converter circuit units by using a capacitance value of a first capacitor included in the respective one of the plurality of panel deviation calibration units when a driving signal is applied to the first one of the driving electrodes.

11 Claims, 12 Drawing Sheets

US 9,436,326 B2

TOUCHSCREEN DEVICE AND METHOD FOR CONTROLLING THE SAME

CROSS-REFERENCE TO RELATED APPLICATION

This application claims the benefit of Korean Patent Application No. 10-2014-0000639, filed on Jan. 3, 2014, with the Korean Intellectual Property Office, the disclosure of which is incorporated herein by reference.

BACKGROUND

The present disclosure relates to a touchscreen device and a method for controlling the same.

A touchscreen device, such as a touchscreen or a touch pad, is a data input device attached to a display device so as to provide an intuitive user interface, and has recently been widely applied to various electronic devices such as cellular phones, personal digital assistants (PDA), and navigation devices. Particularly, as demand for smartphones has been recently increased, touchscreens have been increasingly employed therein, since they are able to provide users with various data input methods in a limited form factor.

Touchscreens used in portable devices may be mainly divided into resistive type touchscreens and capacitive type touchscreens, depending on the manner in which touches are sensed therein. Among these, capacitive type touchscreens have advantages of a relatively long lifespan and ease in the implementation of various types of data input and gestures therefor, and thus it has been increasingly employed. It is especially easy to implement a multi-touch interfaces with capacitive type touchscreens, as compared to resistive type touchscreens, and thus, capacitive type touchscreens are widely used in smartphones and the like.

In capacitive type touchscreens, in the case that capacitance values of capacitors provided on a touch panel are changed by a user's finger or stylus, the changed capacitance values are converted into electrical signals and in turn into digital signals, so that it may be determined whether a touch input has been made. In addition, various methods of converting capacitance values into electrical signals are also being developed. Among others, a method of using integrators is frequently used because it includes several operations of the conversion of capacitance of capacitors into voltage to be output, and thus it contains less noise than other methods in which the conversion is only performed once.

Incidentally, a touchscreen panel may be installed to be operated, like a liquid crystal display (LCD) or an organic light emitting diode (OLED). A transmitting terminal Tx and a receiving terminal Rx of an IC are connected to both panel terminals. The transmitting terminal Tx is provided to drive capacitors in the panel and the receiving terminal Rx is provided to receive signals from the capacitors to be converted into voltages. The number of channels of the receiving terminal Rx is determined depending on the size of the panel, and each of the channels has an offset. The offset may be caused for two reasons. First, the offset may be caused by deviations in capacitance values of capacitors inside the panel. Second, the offset is caused by changes in gains of integration circuits due to changes in PVT. Such an offset may lead to deterioration of linearity and accuracy.

SUMMARY

An exemplary embodiment in the present disclosure may provide a touchscreen device capable of significantly improving linearity and accuracy of a touch input through the calibration of deviations among integration circuits and the calibration of deviations among panel touch nodes, and a method of controlling the same.

According to an exemplary embodiment in the present disclosure, a touchscreen device may include: a panel unit including a plurality of node capacitors formed at intersections between a plurality of driving electrodes and a plurality of sensing electrodes; a driving circuit unit applying a driving signal to each of the plurality of driving electrodes; a sensing circuit unit including a plurality of converter circuit units connected to the plurality of sensing electrodes via a switching circuit, and a plurality of panel deviation calibration units, the sensing circuit unit sensing changes in capacitance generated in intersections between the plurality of driving electrodes to which the driving signals are applied and the plurality of sensing electrodes; and a control unit controlling operations of the driving circuit unit and the sensing circuit unit, wherein the control unit applies a driving signal to a first node capacitor formed at an intersection between a first driving electrode among the plurality of driving electrodes and a first sensing electrode among the plurality of sensing electrodes and calibrates gains of the plurality of converter circuit units so that voltage levels of output signals from the plurality of converter circuit units for the capacitance of the first node capacitor are equal to a predetermined voltage level, and each of the plurality of panel deviation calibration units calibrates an output signal from the respective converter circuit unit among the plurality of converter circuit units by using a capacitance value of a first capacitor included in the respective panel deviation calibration unit among the plurality of panel deviation calibration units when the driving signal is applied to the first driving electrode among the driving electrodes.

The switching circuit may include: a plurality of first switches connecting or disconnecting signal transfer paths between the plurality of sensing electrodes and the plurality of converter circuit units; a calibration switch to which terminals of the plurality of sensing electrodes are connected; and a plurality of second switches, each second switch among the second switches having one terminal connected to the respective first switch among the plurality of first switches and having the other terminal connected to the calibration switch.

The control unit, after applying the driving signal to the first node capacitor, may turn the plurality of first switches off, may turn the calibration switch on, and may turn the plurality of second switches on one by one sequentially, to generate output signals from the plurality of converter circuits to calibrate gains.

Each of the plurality of panel deviation calibration units may generate an output signal from each of the plurality of converter circuit units using a value obtained by subtracting a capacitance value of the first capacitor from a capacitance value of one node capacitor included in the first driving electrode among the driving electrodes.

The control unit may adjust the capacitance value of the first capacitor included in each of the plurality of panel deviation calibration units so that the voltage levels of the output signals from each of the plurality of converter circuit units are equal to one another.

Each of the plurality of converter circuit units may include a first integration circuit unit and a second integration circuit unit, wherein the first integration circuit unit includes a second capacitor charged by a change in capacitance generated in the node capacitor based on the driving signal, and the second integration circuit unit generates the output signal based on the charges charged in the second capacitor.

According to an exemplary embodiment in the present disclosure, a method of controlling a touchscreen device may include: applying a driving signal to a first driving electrode among driving electrodes; generating output signals from a plurality of converter circuit units for capacitance of a first node capacitor included a first driving electrode among the driving electrodes; calibrating gains of the plurality of converter circuit units so that the voltage levels of the output signals from the plurality of converter circuit units are equal to a predetermined voltage level; and sensing capacitance values of a plurality of node capacitors included in the first driving electrode among the driving electrodes, and calibrating using the capacitance values of the plurality of first capacitors so that the voltage levels of the output signals from the plurality of converter circuit units are equal to one another.

The switching circuit may include: a plurality of first switches connecting or disconnecting signal transfer paths between the plurality of sensing electrodes and the plurality of converter circuit units; a calibration switch having one terminal connected to a first sensing electrode among the plurality of sensing electrodes intersecting the first driving electrode among the driving electrodes; and a plurality of second switches, each second switch among the second switches having one terminal connected to the respective first switch among the plurality of first switches and having the other terminal connected to the calibration switch.

The generating of the output signals may include: turning the plurality of first switches off and turning the calibration switch on; turning on a second switch among the plurality of second switches located on a signal transfer path to the first sensing electrode among the sensing electrodes so as to generate an output signal from the first converter circuit unit connected to the first sensing electrode among the sensing electrodes; and turning on the other second switches among the second switches so as to generate output signals from the plurality of converter circuit units other than the first converter circuit unit.

The calibrating using the capacitance values of the plurality of first capacitors may include: sensing capacitance values of the node capacitors included in the first driving electrode among the driving electrodes sequentially; and subtracting the capacitance values of the plurality of first capacitors from the capacitance values of the node capacitors included in the first driving electrode among the driving electrodes and calibrating deviations of the node capacitors using the subtracted values.

According to an exemplary embodiment in the present disclosure, a method of controlling a touchscreen device may include: applying a driving signal to a first driving electrode among driving electrodes; sensing capacitance values of node capacitors included in the first driving electrode among the driving electrodes sequentially; calibrating using the capacitance values of the plurality of first capacitors so that voltage levels of output signals from a plurality of converter circuit units are equal to one another using capacitance values of a plurality of first capacitors; generating output signals from the plurality of converter circuit units for capacitance of a first node capacitor included a first driving electrode among the driving electrodes via switching operations of a switching circuit; and calibrating the gains of the plurality of converter circuit units so that the voltage levels of the output signals from the plurality of converter circuit units are equal to a predetermined voltage level.

The switching circuit may include: a plurality of first switches connecting or disconnecting signal transfer paths between the plurality of sensing electrodes and the plurality of converter circuit units; a calibration switch having one terminal connected to a first sensing electrode among the plurality of sensing electrodes intersecting the first one of the driving electrodes; and a plurality of second switches, each second switch among the second switches having one terminal connected to the respective first switch among the plurality of first switches and having the other terminal connected to the calibration switch.

The generating of the output signals may include: turning the plurality of first switches off and turning the calibration switch on; turning on a second switch among the plurality of second switches located on a signal transfer path to the first sensing electrode among the sensing electrodes so as to generate an output signal from the first converter circuit unit connected to the first sensing electrode among the sensing electrodes; and turning on the other second switches among the second switches so as to generate output signals from the plurality of converter circuit units other than the first converter circuit unit.

The calibrating using the capacitance values of the plurality of first capacitors may include: calibrating deviations of the plurality of node capacitors using values obtained by subtracting the capacitance values of the plurality of first capacitors from the capacitance values of the plurality of node capacitors included in the first driving electrode among the driving electrodes.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
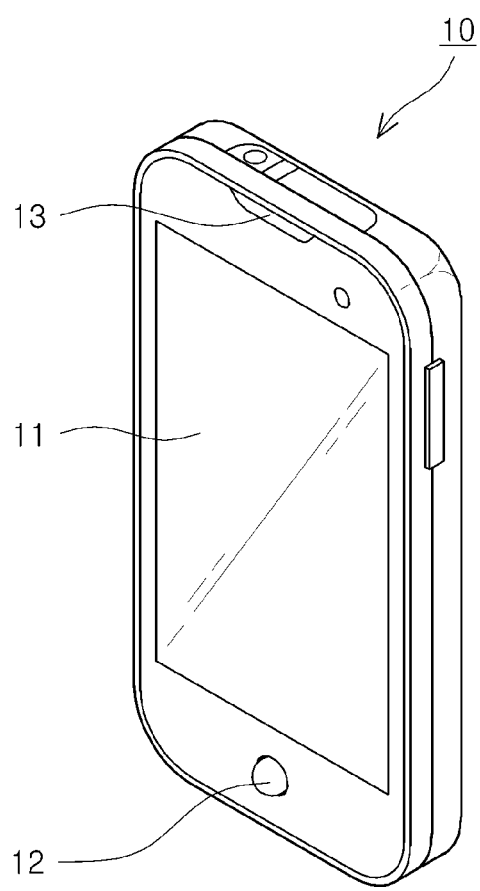
FIG. 1 is a perspective view of an electronic apparatus including a touchscreen device according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

FIG. 1 is a perspective view of an electronic apparatus including a touchscreen device according to an exemplary embodiment of the present disclosure. Referring to FIG. 1, the electronic device 10 according to the embodiment of the present disclosure may include a display apparatus 11 for outputting a screen, an input unit 12, an audio unit 13 for outputting audio, and a touchscreen device integrated with the display apparatus 11.

As shown in FIG. 1, in the case of a mobile device, the touchscreen device may be generally provided in a state in which it is integrated with the display apparatus and needs to have a sufficient degree of light transmissivity to allow an image displayed on the display apparatus to be transmitted therethrough. Therefore, the touchscreen device may be implemented by forming a sensing electrode on a base substrate formed of a transparent film material such as polyethylene telephthalate (PET), polycarbonate (PC), polyethersulfone (PES), polyimide (PI), or the like, using a transparent and electrically conductive material such as indium tin oxide (ITO), indium zinc oxide (IZO), zinc oxide (ZnO), carbon nano tube (CNT), or graphene. The display device may include a wiring pattern disposed in a bezel region thereof, in which the wiring pattern is connected to the sensing electrode formed of the transparent and conductive material. Since the wiring pattern is hidden by the bezel region, it may be formed of a metal material such as silver (Ag) and copper (Cu).

Since it is assumed that the touchscreen device according to the embodiment of the present disclosure is operated in a capacitive scheme, the touchscreen device may include a plurality of electrodes having a predetermined pattern. In addition, the touchscreen device according to the embodiment may include a capacitance sensing device for detecting a change in capacitance generated in the plurality of electrodes. Hereinafter, the touchscreen device according to the exemplary embodiment will be described with reference to FIGS. 2 through 12.

Figure 2:
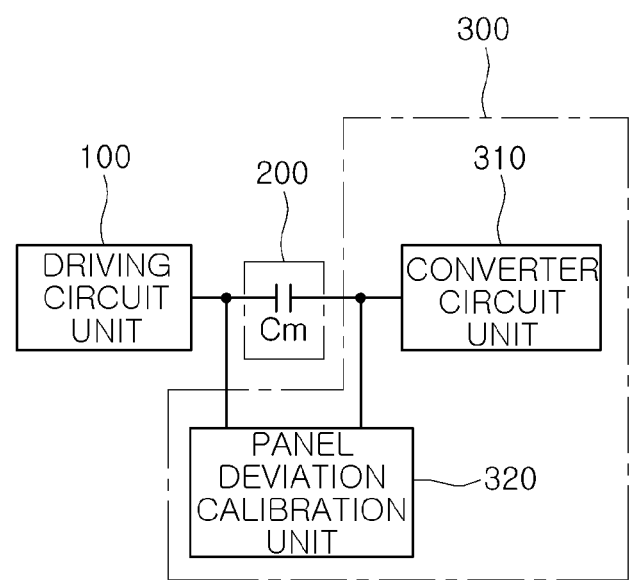
FIG. 2 is a block diagram of a capacitance sensing device in a touchscreen device according to an exemplary embodiment of the present disclosure.

FIG. 2 is a block diagram of a capacitance sensing device in a touchscreen device according to an exemplary embodiment of the present disclosure.

Referring to FIG. 2, the capacitance sensing device in the touchscreen device according to the exemplary embodiment may include a driving circuit unit 100, a sensing circuit unit 300, and a capacitor (Cm) 200.

The capacitor Cm may be connected between the driving circuit unit 100 and the sensing circuit unit 300, in which a change in capacitance may be generated to be detected. That is, the capacitor Cm may correspond to mutual-capacitance generated between a pluralities of electrodes included in a capacitive type touchscreen. Hereinafter, for convenience of illustration, it is assumed that the capacitance sensing device in the touchscreen according to the exemplary embodiment senses a change in capacitance generated in the capacitive touchscreen. In this case, the capacitor Cm may be a node capacitor in or from which charges are charged or discharged according to a change in the mutual-capacitance generated in the intersections between the pluralities of electrodes.

The driving circuit unit 100 may generate a driving signal for charging the charges in the capacitor Cm and supply the generated driving signals to the capacitor Cm. The driving signal may be a square wave of a pulse train and has a predetermined frequency.

The sensing circuit unit 300 may include a converter circuit unit 310 and a panel deviation calibration unit 320. These elements will be described below with reference to FIG. 3.

Figure 3:
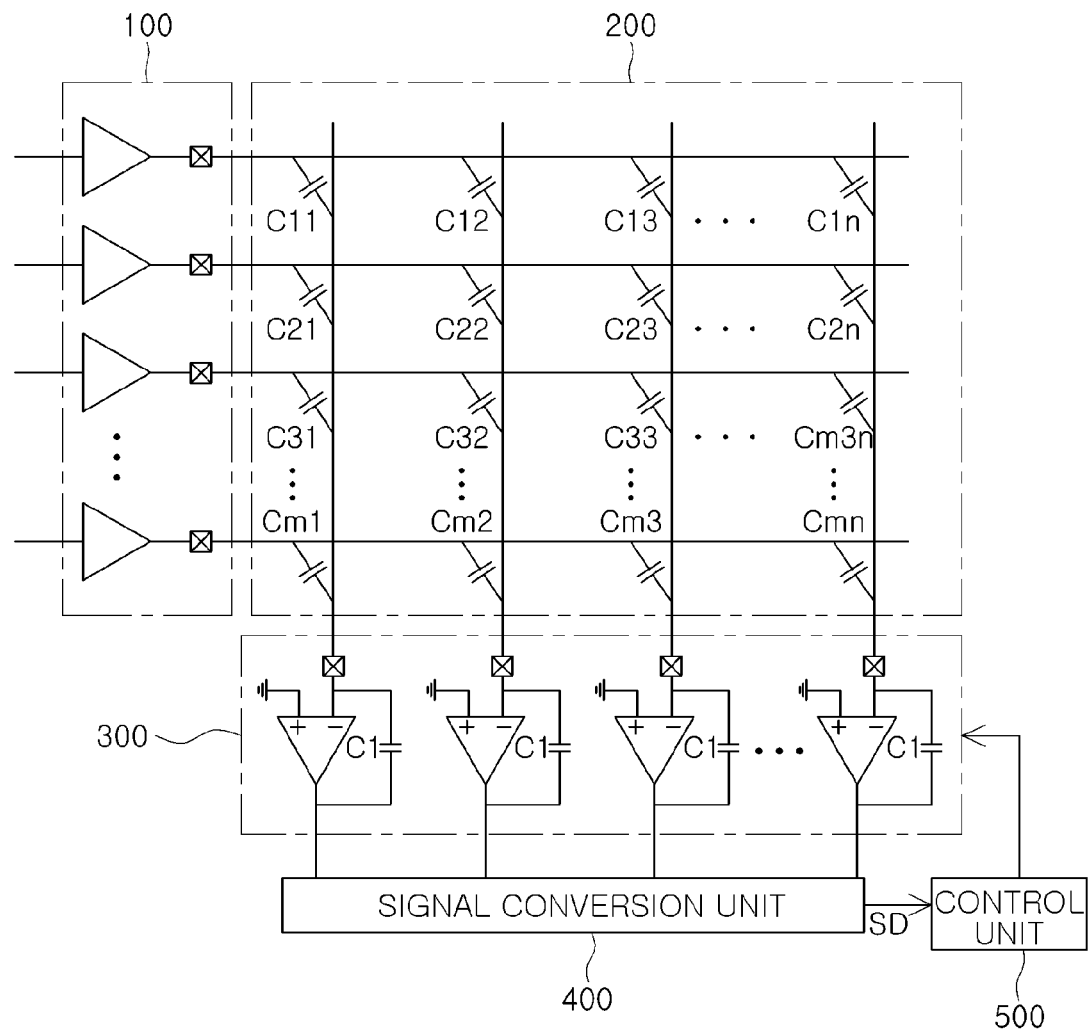
FIG. 3 is a diagram showing a touchscreen device according to an exemplary embodiment of the present disclosure.

FIG. 3 is a diagram showing a touchscreen device according to an exemplary embodiment of the present disclosure.

Referring to FIG. 3, the touchscreen device according to the exemplary embodiment may include a driving circuit unit 100, a panel unit 200, and a sensing circuit unit 300, and a control unit 500.

The panel unit 200 may include a plurality of node capacitors formed at the intersections between a plurality of driving electrodes and a plurality of sensing electrodes. The panel unit 200 may include a plurality of driving electrodes extending in a first axis direction (that is, a horizontal direction of FIG. 3) and a plurality of sensing electrodes extending in a second axis direction (that is, a vertical direction of FIG. 3).

Further, changes in capacitance C11 to Cmn may be generated in intersections between the plurality of driving electrodes and the plurality of sensing electrodes. The changes in capacitance C11 to Cmn generated in intersections between the plurality of driving electrodes and the plurality of sensing electrodes may be changes in the mutual-capacitance generated by the driving signals applied by the driving circuit unit 100.

The driving circuit unit 100, the sensing circuit unit 300, the signal conversion unit 400, and the control unit 500 may be implemented as a single integrated circuit (IC).

The driving circuit unit 100 may apply a driving signal to each of the plurality of the driving electrodes on the panel unit 200. The driving signals may be square wave signals, sine wave signals, triangle wave signals or the like having a specific frequency and an amplitude and may be sequentially applied to the plurality of first electrodes. Although FIG. 3 illustrates that circuits for generating and applying the driving signals are individually connected to the plurality of first electrodes, it is apparent that a single driving signal generating circuit may be used to apply the driving signals to the plurality of first electrodes by employing a switching circuit.

The sensing circuit unit 300 may include a plurality of converter circuit units connected to the plurality of sensing electrodes via a switching circuit, and a plurality of panel deviation calibration units having a capacitor and may sense changes in capacitance generated in the intersections between the plurality of driving electrodes to which the driving signals are applied and the plurality of sensing electrodes.

The sensing circuit unit 300 may include integration circuits for sensing the changes in capacitance C11 to Cmn from the plurality of sensing electrodes. Each of the integration circuits may include at least one operational amplifier and a capacitor C1 having specific capacitance. The operational amplifier has an inverting input terminal connected to the plurality of sensing electrodes to convert the changes in capacitance C11 to Cmn into analog signals in the form of voltage, for example, and then output the analog signals. When the driving signals are sequentially applied to the plurality of driving electrodes, changes in capacitance may be detected simultaneously from the plurality of sensing electrodes, and thus the number of integration circuits to be provided may be equal to that of the plurality of sensing electrodes, i.e., m.

The signal conversion unit 400 may generate digital signals $S_D$ from the analog signals generated by the integration circuit. For example, the signal conversion unit 400 may include a time-to-digital converter (TDC) circuit measuring a time in which the analog signals in the form of voltage output from the sensing circuit unit 300 reach a predetermined reference voltage level to convert the measured time into the digital signal $S_D$, or an analog-to digital-converter (ADC) circuit measuring an amount by which a level of the analog signals output from the sensing circuit unit 300 is changed for a predetermined time to convert the changed amount into the digital signal $S_D$.

The control unit 500 may control the operations of the driving circuit unit 100 and the sensing circuit unit 300. The control unit 500 may determine whether a touch is made on the panel unit 200 based on a digital signal $S_D$. In an exemplary embodiment, the control unit 500 may determine the number of touch inputs made on the panel unit 200, coordinates of the touch inputs, and the types of the gesture of the touch.

Each of the node capacitors C11 to Cmn generated in intersections between the driving electrodes and the sensing electrodes of the touchscreen device shown in FIG. 3 corresponds to the capacitor Cm in the capacitance sensing device shown in FIG. 2. Further, the sensing circuit unit 300 shown in FIG. 3 may be an element that includes the converter circuit unit 310 and the panel deviation calibration unit 320 shown in FIG. 2.

Figure 4:
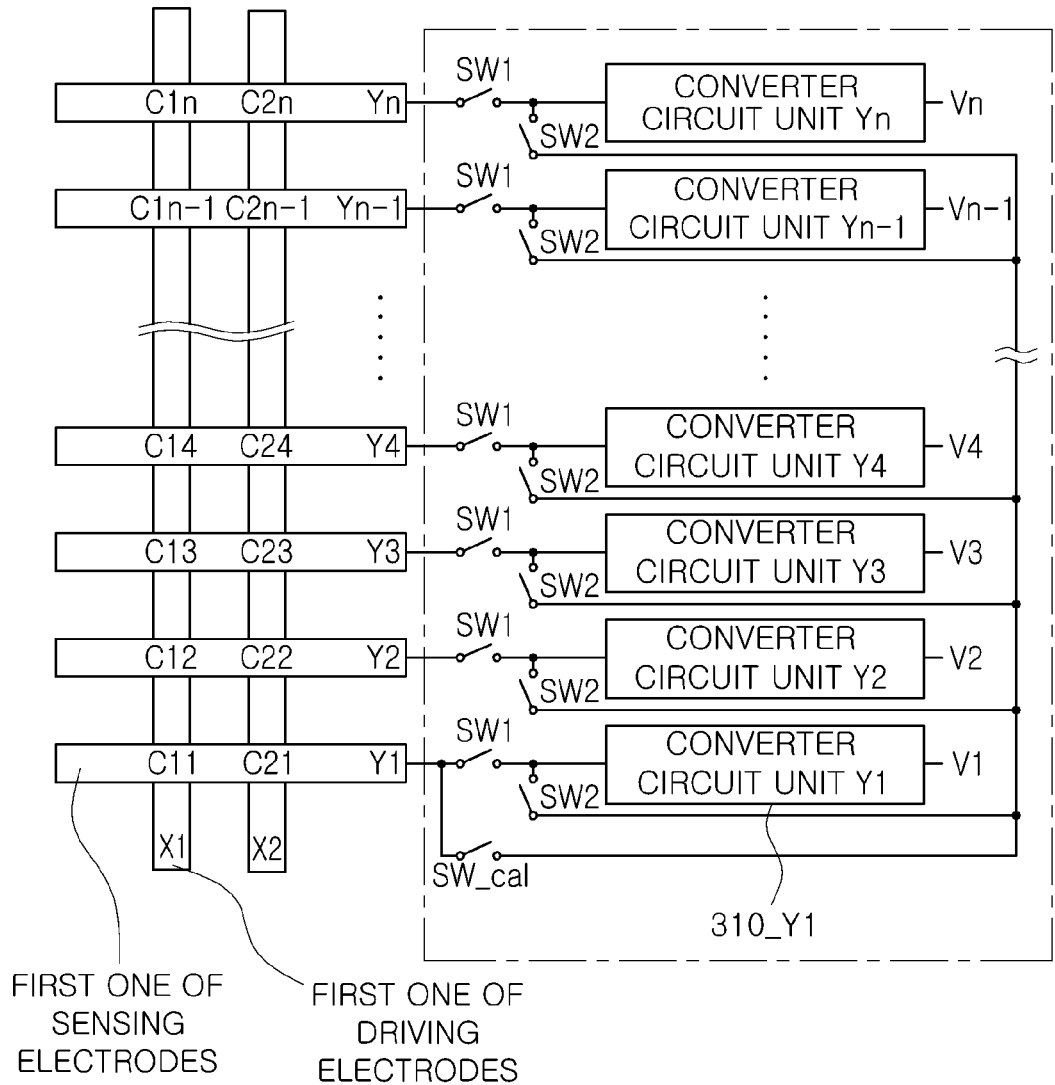
FIG. 4 is a diagram for illustrating a calibration operation by a touchscreen device according to an exemplary embodiment of the present disclosure.

FIG. 4 is a diagram for illustrating a calibration operation by a touchscreen device according to an exemplary embodiment of the present disclosure.

At first, calibrating deviations among integration circuits will be described in detail with reference to FIGS. 3 and 4.

Here, the sensing circuit unit 300 among the elements of a touch screed device according to an exemplary embodiment of the present disclosure may include a plurality of converter circuit units 310_Y1 to 310_Yn and a switching circuit. The plurality of converter circuit units 310_Y1 to 310_Yn may be connected to the plurality of sensing electrodes via the switching circuit.

The switching circuit may include a plurality of first switches SW1 connects or disconnects signal transfer paths between the plurality of sensing electrodes and the plurality of converter circuits 310_Y1 to 310_Yn, a calibration switch SW_cal to which one terminal of the first one Y1 of the plurality of sensing electrodes, and a plurality of second switches SW2. Each of the plurality of second switches SW2 may have one terminal connected to the respective first switch SW1 of the plurality of first switches SW1, and the other terminal connected to the calibration switch SW_cal.

Next, an operation by the touchscreen device to calibrate deviations among integration circuits will be described in detail.

Initially, the control unit 500 may turn off all of the plurality of first switches SW1 and may turn the calibration switch SW_cal on in the switching circuit. Then, when the first driving electrode line is driven, a driving signal may be applied to the first node capacitor C11 formed at the intersection between the first one X1 of the driving electrodes and the first one Y1 of the sensing electrodes. Then, the control unit 500 may turn the plurality of second switches SW2 on sequentially. The order of turning the plurality of second switches SW2 on may be, for example, from one associated with the converter circuit unit 310_Y1 to one associated with the converter circuit unit 310_Yn.

In this example, each of the converter circuit units 310_Y1 to 310_Yn may convert capacitance in the first node capacitors C11 into voltage.

As a result, the voltage levels of the output signals from the plurality of converter circuits 310_Y1 to 310_Yn may be expressed as Mathematical Expression 1:

Voltage level $V1$ of output signal from converter circuit unit $310\_Y1 = Vtx*C11*A1*clk$ Voltage level $V2$ of output signal from converter circuit unit $310\_Y2 = Vtx*C11*A2*clk$ Voltage level $Vn$ of output signal from converter circuit unit $310\_Yn = Vtx*C11*An*clk$ [Mathematical Expression 1]

where A1 to An denote gains of the converter circuit units 310_Y1 to 310_Yn, respectively. The gains may be variously represented depending on the structure of the converter circuit units 310_Y1 to 310_Yn. That is, in order to calibrate deviations among the integration circuits, gains of the converter circuit units 310_Y1 to 310_Yn may be adjusted individually, and the gains of the converter circuit units 310_Y1 to 310_Yn may be adjusted so that all of the voltage levels in the output signals from the converter circuit units 310_Y1 to 310_Yn is equal to a predetermined voltage level.

That is, by varying the gains A1 to An to make offsets of integration circuits between channels to zero, one of the two above-described reasons that cause the offsets may be eliminated.

Next, calibrating deviations among the panel touch nodes by the control unit 500 will be described in detail.

Prior to describing the calibrating of deviations, a touchscreen device according to an exemplary embodiment of the present disclosure will be described in detail.

Figure 5:
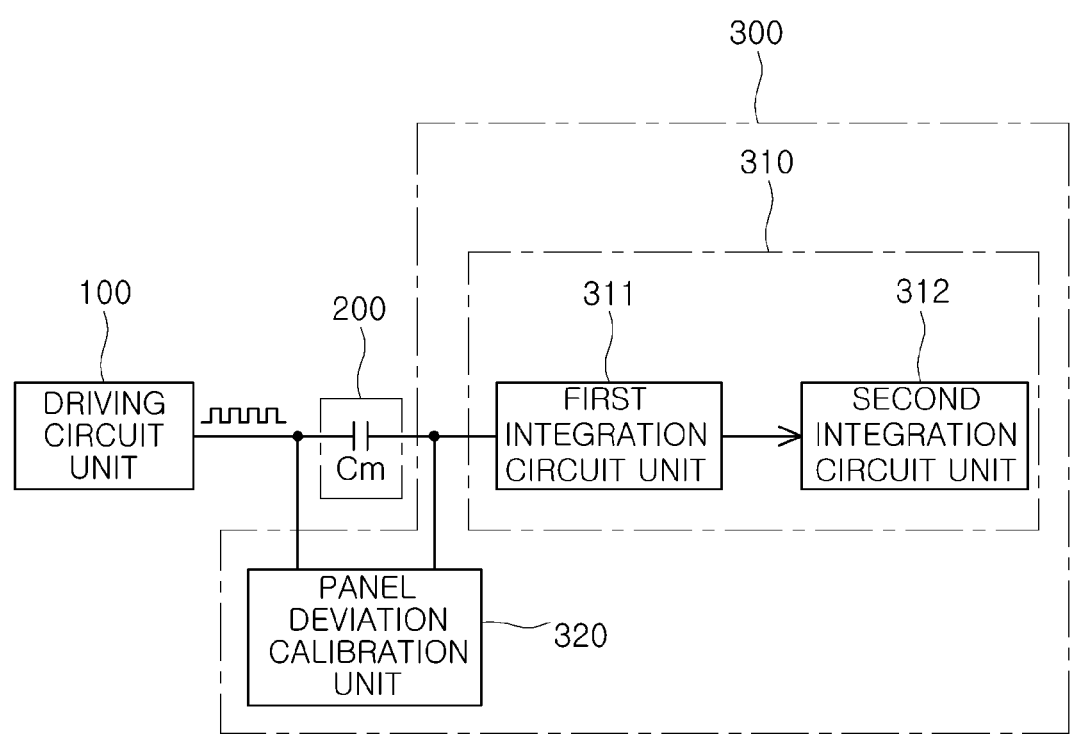
FIG. 5 is a block diagram of the touchscreen device shown in FIG. 2 in more detail.

FIG. 5 is a block diagram of the touchscreen device shown in FIG. 2 in more detail.

Figure 6:
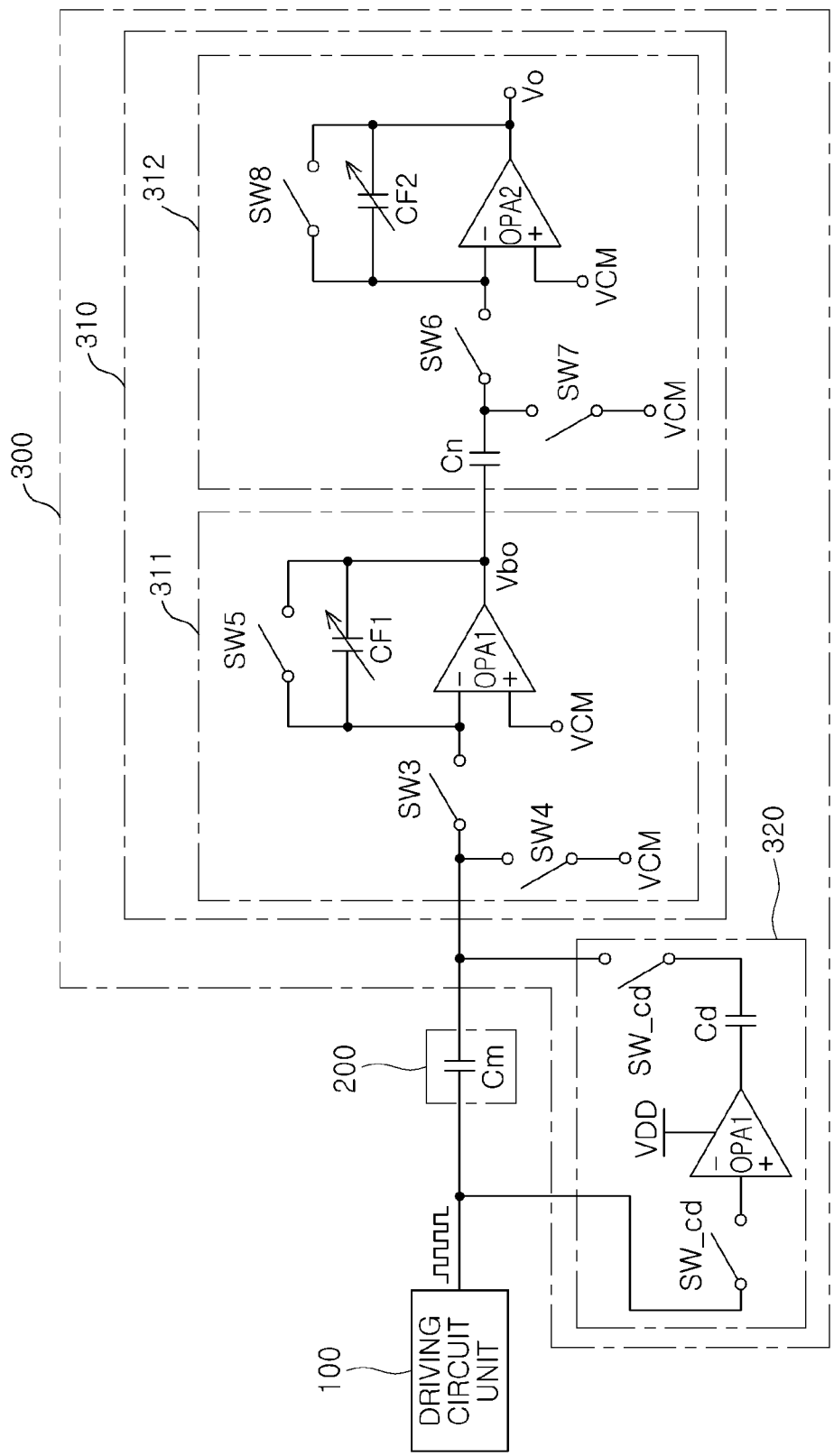
FIG. 6 is a circuit diagram illustrating the capacitance sensing device in the touchscreen device shown in FIG. 5 in detail.

FIG. 6 is a circuit diagram illustrating the capacitance sensing device in the touchscreen device shown in FIG. 5 in detail.

Referring to FIGS. 5 and 6, the converter circuit unit 310 in the touchscreen device according to the exemplary embodiment may include a first integration circuit unit 311 and a second integration circuit unit 312.

Referring to FIG. 6, the first integration circuit unit 311 may include at least one capacitor and is charged or discharged by receiving the charges charged in the capacitor Cm. The first integration circuit unit 311 may generate an output voltage based on the amount of charges charged in or discharged from the capacitor. That is, the output voltage from the first integration circuit unit 311 may be determined depending on capacitance of the capacitor Cm, capacitance of the capacitor included in the first integration circuit unit 311, the voltage level of the driving signal, and the like.

The second integration circuit unit 312 may include at least one capacitor which is charged or discharged by receiving the charges charged in the capacitor included in the first integration circuit unit 311. The second integration circuit unit 312 may generate an output voltage based on the amount of charges charged in or discharged from the capacitor.

Each of the first and second integration circuit units 311 and 312 may include a plurality of switches. By controlling the switching operations of the switches, operations of the first and second integration circuit units 311 and 312 may be controlled.

A method of calibrating deviations among panel touch nodes will be described in detail with reference to FIGS. 4 and 6. In the exemplary embodiment, calibrating deviations among integration circuits is performed and followed by calibrating deviations among panel touch nodes. However, the order of calibrating deviations is not limited thereto but calibrating deviations among panel touch nodes may be performed and followed by calibrating deviations among integration circuits.

After calibration of the integration circuits, the control unit 500 may turn on the plurality of first switches SW1 and may turn off the plurality of second switches SW2 and the calibration switch SW_cal. Then, the control unit 500 may normally drive the first one X1 of the driving electrodes. At this time, the voltage level of the output signal from the plurality of converter circuit units 310_Y1 to 310_Yn may be expressed as Mathematical Expression 2:

Voltage level $V1$ of output signal from converter
circuit unit 310_$Y1$=$Vtx*C11*A*$clk Voltage level $V2$ of output signal from converter
circuit unit 310_$Y2$=$Vtx*C12*A*$clk Voltage level $Vn$ of output signal from converter
circuit unit 310_$Yn$=
$Vtx*C1n*A*$clk [Mathematical Expression 2]

where A denotes actual gain of integration circuit with calibrated deviation thereof. It is noted from the results from the plurality of converter circuit units 310_Y1 to 310_Yn that different results may be obtained depending on the panel nodes. Therefore, the different results may be calibrated by calibrating capacitance C11 to C1n through the panel deviation calibration unit 320 according to an exemplary embodiment of the present disclosure.

Specifically, referring to FIG. 6, the panel deviation calibration unit 320 may include a plurality of switches SW_cd, an operational amplifier OPA1 having an inverting input terminal connected to supply voltage VDD, and a first capacitor $C_d$. In this connection, the panel deviation calibration unit 320 may be included in the sensing circuit unit 300.

Therefore, the voltage levels of the output signal from the plurality of converter circuits 310_Y1 to 310_Yn may be expressed as Mathematical Expression 3 through the plurality of the panel deviation calibration units 320 associated therewith:

Voltage level $V1$ of output signal from converter
circuit unit 310_$Y1$=$Vtx*(C11-Cd1)*A*$clk Voltage level $V2$ of output signal from converter
circuit unit 310_$Y2$=$Vtx*(C12-Cd2)*A*$clk Voltage level $Vn$ of output signal from converter
circuit unit 310_$Yn$=
$Vtx*(C1n-Cdn)*A*$clk [Mathematical Expression 3]

where A=Cn/(CF1*CF2). Accordingly, by calibrating every one of the plurality of first capacitors $C_{d1}$ to $C_{dn}$ at every nodes, the output voltage Vo with no touch may become constant. That is, capacitance values of the plurality of first capacitors $C_d$ may be set differently so that the voltage levels of the output signals from all of the converter circuit units 310_Y1 to 310_Yn become constant.

The voltage levels of the output signals from the plurality of converter circuit units 310_Yn after node deviation calibration may be expressed as Mathematical Expression 4 below:

Voltage level $Vn$ of output signal from converter
circuit unit 310_$Yn$=
$Vtx*(Ceff)*A*$clk [Mathematical Expression 4]

Accordingly, referring to Mathematical Expression 4, all of the output voltages from the plurality of converter circuit units 310_Y1 to 310_Yn for all of the nodes with no touch may be maintained constantly.

In the above-described example of calibrating deviations among the integration circuits and calibrating deviations among panel touch nodes, the voltage levels Vo1 an Vo2 of the output signals from the converter circuit units 310 for certain nodes m1 and m2 may be expressed as mathematical Expression 5 below:

$Vo1=(Cm1-Cd1)*Aeff=Ceff*Aeff$ $Vo2=(Cm2-Cd2)*Aeff=Ceff*Aeff$ [Mathematical Expression 5]

where Aeff denotes calibrated gain of the converter circuit unit 310. Although setting values are different, the absolute gain is the same. Further, the capacitance values of the first capacitors $C_d$ may be set to different values so that Vo is constant for all of the nodes of the panels. Accordingly, the values of Ceff of all of the nodes become constant.

Therefore, if the values of $\Delta Cm$ in two nodes are the same with a touch, the values of $\Delta V$ are the same, so that the linearity and accuracy of touch data may be improved.

Figure 7:
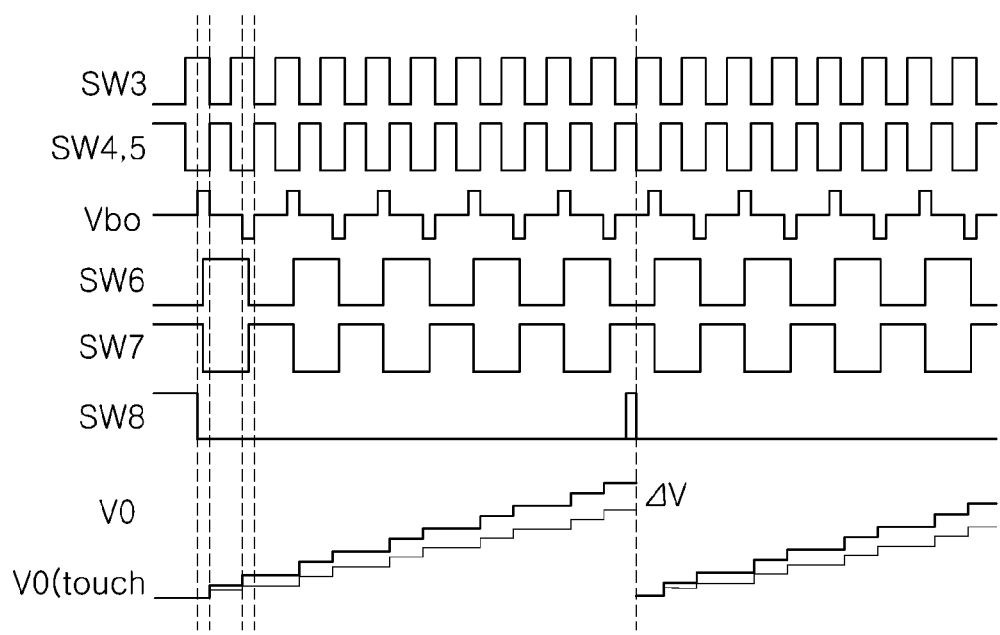
FIG. 7 is a diagram for illustrating the operations of a touchscreen device according to an exemplary embodiment of the present disclosure.

FIG. 7 is a diagram for illustrating the operations of a touchscreen device according to an exemplary embodiment of the present disclosure.

Referring to FIGS. 6 and 7, the first integration circuit unit 311 is connected to the second node of the capacitor Cm. The first integration circuit unit 311 may include an operational amplifier OPA1, a capacitor CF1, a capacitor Cn, a switch SW3, a switch SW4, a switch SW5, and the like. At this time, the switches SW3 and SW4 may be operated at different turn-on timings.

The charges may be supplied to the capacitor CF1 of the first integration circuit unit 311 through the capacitor Cm by turning on and off the switch SW3. During a time in which the switch SW5 connected in parallel with the capacitor CF1 of the first integration circuit unit 311 is turned off, the charges charged in the capacitor Cm may be transferred to the capacitor CF1, and during a time in which the switch SW5 is turned on, the operational amplifier OPA1 may be reset. The output voltage $V_{bout}$ from the operational amplifier OPA1 generated by the charges charged in the capacitor CF1 may be determined as expressed by Equation 1 below:

$$Vbout = \frac{VDD*Cm}{CF1} \quad \text{[Equation 1]}$$

As can be seen from Equation 1, the output voltage $V_{bo}$ from the first integration circuit unit 311 may be determined based on the ratio of capacitance between the capacitor Cm and the capacitor CF1. Therefore, by configuring the capacitors CF1 to have capacitance significantly larger than that of the capacitors Cm including charges to be measured, the output voltage $V_{bo}$ from the first integration circuit units 311 may be prevented from being saturated.

To a second node of the capacitor Cn included in the first integration circuit unit 311, the second integration circuit unit 312 may be connected. The second integration circuit unit 312 may include an operational amplifier OPA2, a capacitor CF2, a switch SW6, a switch SW7, a switch SW8, and the like. The switches SW6 and SW7 may be operated at different turn-on timings.

While the switch SW6 is turned on and the switches SW7 and SW8 are turned off, the charges charged in the capacitor $C_n$ of the first integration circuit unit 311 may be delivered to the capacitor CF2, and while the switch SW8 is turned on, the operational amplifier OPA1 may be reset.

Figure 8:
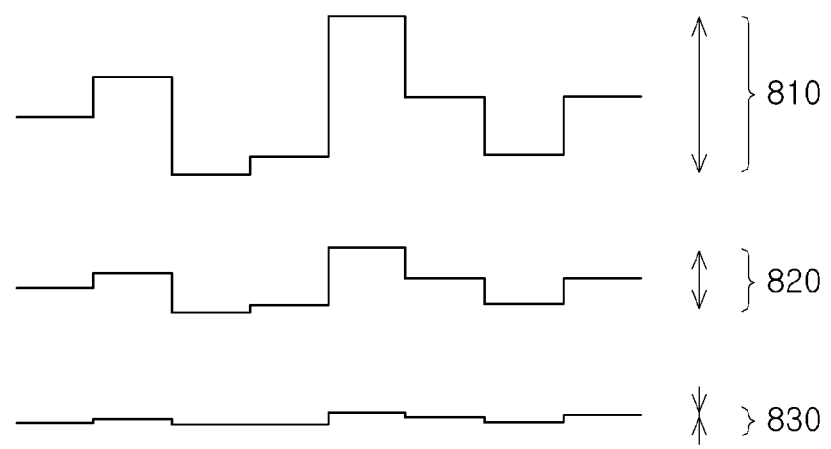
FIG. 8 is a diagram showing an example of output from a converter circuit unit in a touchscreen device according to an exemplary embodiment of the present disclosure.

FIG. 8 is a diagram showing an example of output from a converter circuit unit in a touchscreen device according to an exemplary embodiment of the present disclosure.

Referring to FIG. 8, a graph 810 shows a waveform when neither deviations among integration circuits nor deviations among panel touch nodes are calibrated. In this graph, the width of the graph represents deviations in gains of the converter circuit unit 310 and the deviations among the panel ouch nodes are combined.

Then, a graph 820 shows a waveform when deviations in gains of the converter circuit unit 310 have been calibrated. In this graph, it can be seen that no gain deviation of the converter circuit unit 310 exists and deviations among the panel touch nodes exist solely.

Then, a graph 830 shows a waveform when both deviations among integration circuits and deviations among panel touch nodes are calibrated. In this graph, it can be seen that no deviations in gains of the converter circuit unit 310 and no deviations among the panel touch nodes exists.

Figure 9:
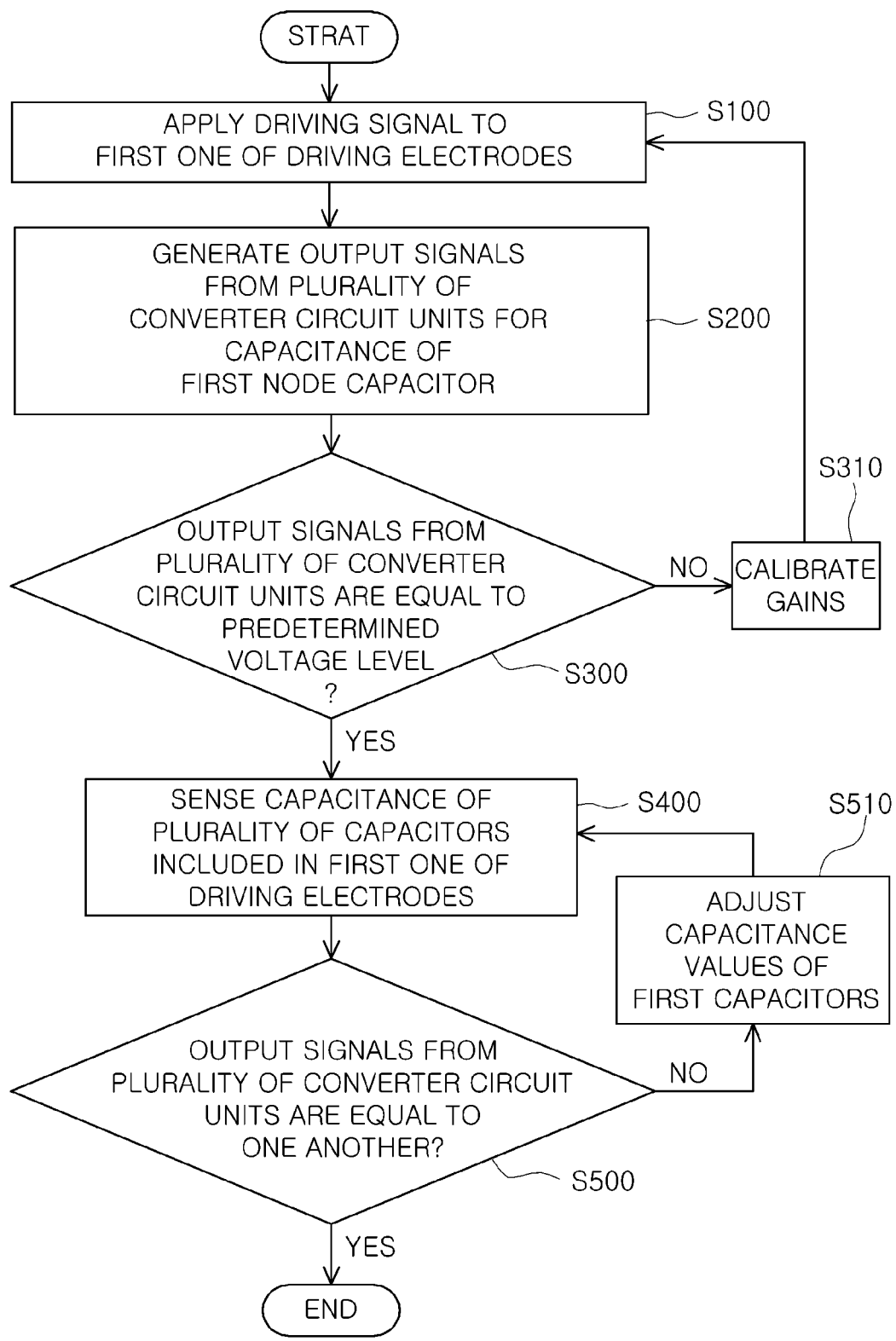
FIG. 9 is a flow chart for illustrating a method for controlling a touchscreen device according to another exemplary embodiment of the present disclosure.

FIG. 9 is a flow chart for illustrating a method for controlling a touchscreen device according to another exemplary embodiment of the present disclosure.

Referring to FIGS. 3, 6 and 9, the method for controlling a touchscreen device according to this exemplary embodiment may include applying a driving signal to the first one X1 of the driving electrodes (S100), generating output signals from a plurality of converter circuit units 310 for capacitance of a first node capacitor C11 included in the first one X1 of the driving electrodes through the switching operations of a switching circuit (S200), determining whether the voltage levels of the output signals from the plurality of converter circuit units 310 are equal to a predetermined voltage level (S300), and if not, calibrating gains of the plurality of converter circuit units 310 (S310). By doing so, deviations in the gains of the plurality of converter circuit units 310 may be calibrated.

Subsequently, the method for controlling a touchscreen device according to this exemplary embodiment may include, if the voltage levels of the output signals from the plurality of converter circuit units 310 are equal to the predetermined voltage level, sensing a capacitance value at each of a plurality of node capacitors included in the first one X1 of the driving electrodes (S400), determining whether the voltage levels of the output signals from the plurality of converter circuit units 310 are equal to one another (S500), and if not, calibrating gains of the plurality of converter circuit units 310 using the capacitance values of the plurality of first capacitors $C_d$ (S510).

Figure 10:
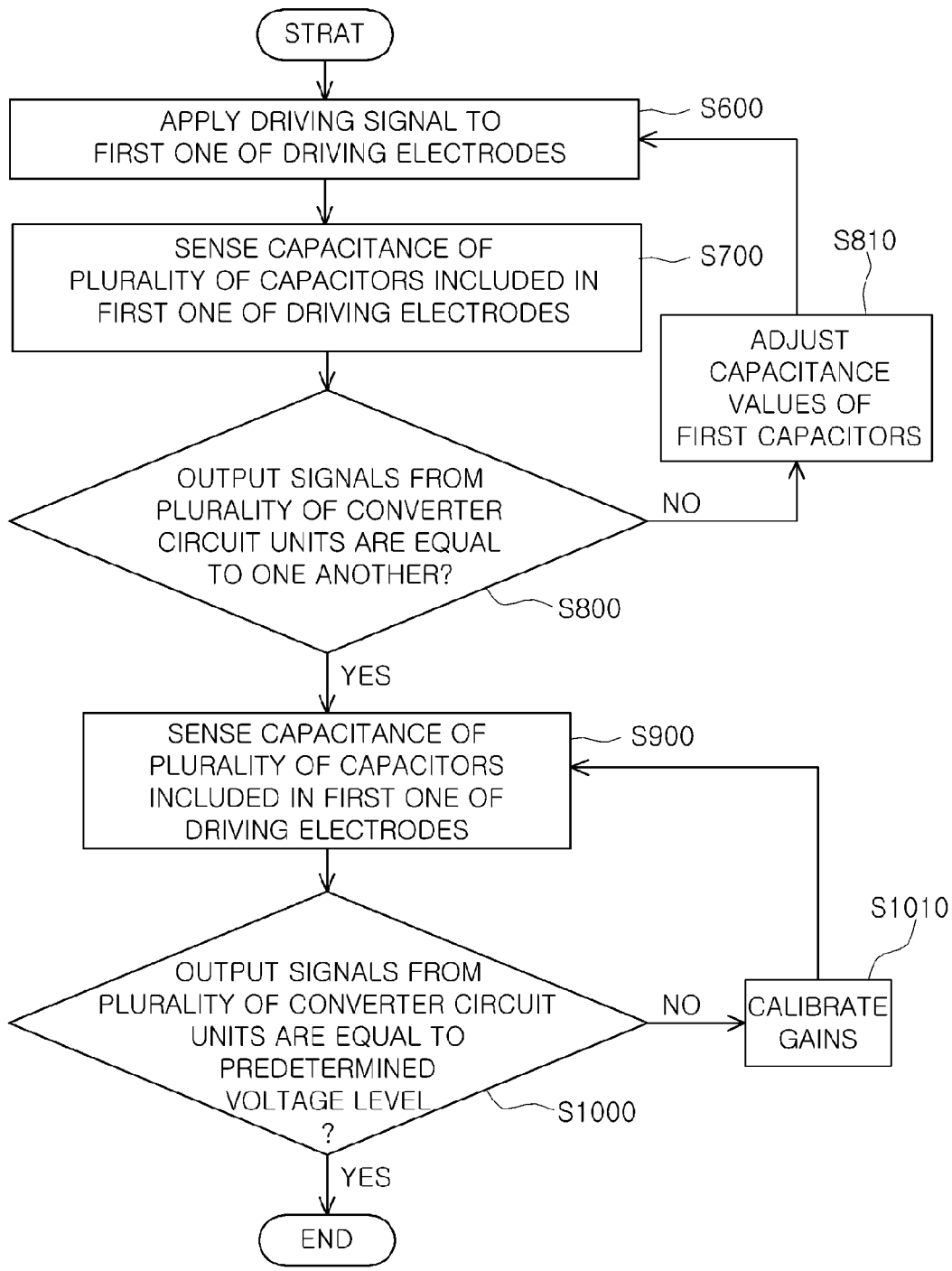
FIG. 10 is a flow chart for illustrating a method for controlling a touchscreen device according to another exemplary embodiment of the present disclosure.

FIG. 10 is a flow chart for illustrating a method for controlling a touchscreen device according to another exemplary embodiment of the present disclosure.

Referring to FIGS. 3, 6 and 10, the method for controlling a touchscreen device according to this exemplary embodiment may include applying a driving signal to a first one X1 of the driving electrodes (S600), sensing a capacitance value at each of a plurality of node capacitors included in the first one X1 of the driving electrodes (S700), determining whether the voltage levels of the output signals from the plurality of converter circuit units 310 are equal to one another (S800), and if not, calibrating gains of the plurality of converter circuit units 310 using the capacitance values of the plurality of first capacitors $C_d$ (S810).

Subsequently, the method for controlling a touchscreen device according to this exemplary embodiment may include, if the voltage levels of the output signals from the plurality of converter circuit units 310 are equal to the predetermined voltage level, generating output signals from a plurality of converter circuit units 310 for capacitance of a first node capacitor C11 included in the first one X1 of the driving electrodes through the switching operations of a switching circuit (S900), determining whether the voltage levels of the output signals from the plurality of converter circuit units 310 are equal to the predetermined voltage level (S1000), and if not, calibrating gains of the plurality of converter circuit units 310 (S1010).

That is, unlike the method for controlling a touchscreen device illustrated in FIG. 9, the method for controlling a touchscreen device illustrated in FIG. 10 may first calibrate deviations among the panel touch nodes and then calibrate deviations among the integrated circuits.

Figure 11:
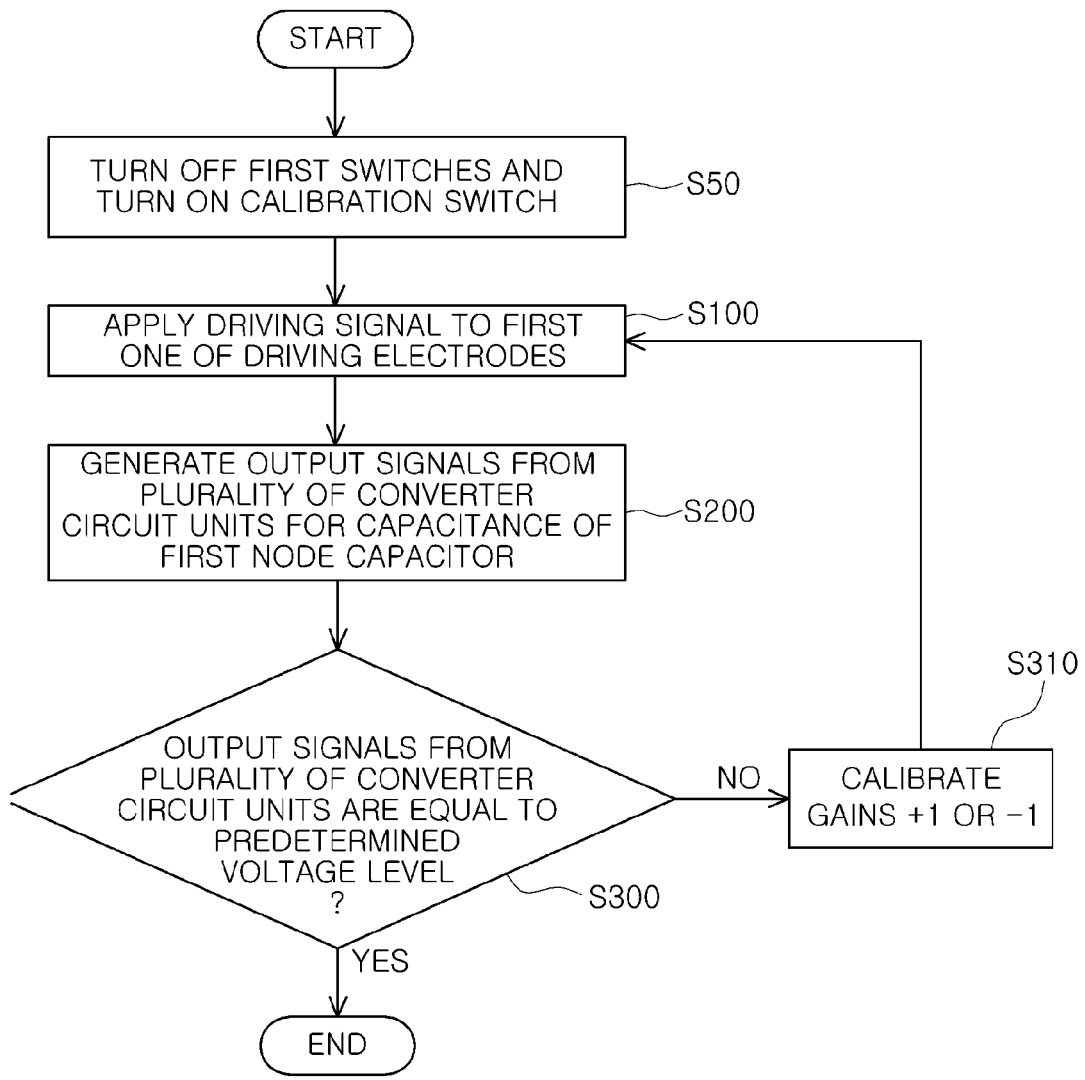
FIG. 11 is a flow chart for illustrating the calibrating gains of the converter circuit unit in the method for controlling a touchscreen device in detail.

FIG. 11 is a flow chart for illustrating the calibrating gains of the converter circuit unit 310 in the method for controlling a touchscreen device in detail.

Referring to FIG. 11, if the voltage levels of the output signals from the plurality of converter circuit units 310 are equal to the predetermined voltage level, the gains of the plurality of converter circuit units 310 may be adjusted by increasing by +1 or decreasing by −1. Then, the calibrating gains of the converter circuit unit 310 may include applying a driving signal to the first one X1 of the driving electrodes (S100), and generating output signals from the plurality of converter circuit units 310 (S200).

That is, the gains of the plurality of converter circuit units 310 may be adjusted until the voltage levels of the output signals from the plurality of converter circuit units 310 become equal to the predetermined voltage level.

Figure 12:
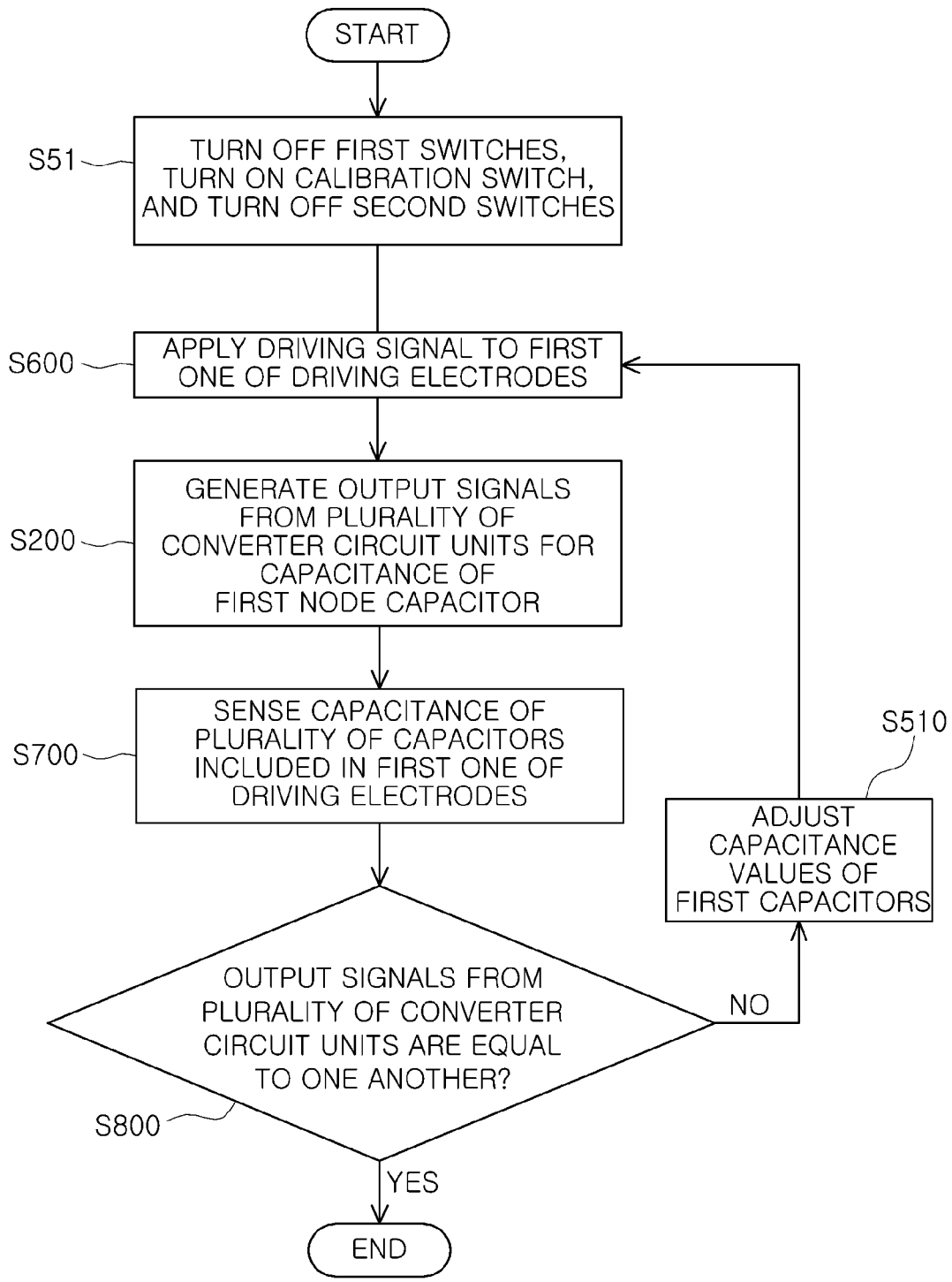
FIG. 12 is a flow chart for illustrating the calibrating deviations among the panel touch nodes in the method for controlling a touchscreen device in detail.

FIG. 12 is a flow chart for illustrating the calibrating deviations among the panel touch nodes in the method for controlling a touchscreen device in detail.

Referring to FIG. 12, if the voltage levels of the output signals from the plurality of converter circuit units 310 are not equal to one another (S800), the capacitance values of the first capacitors $C_d$ may be adjusted. Then, the calibrating deviations among the panel touch nodes may include repeating applying the driving signal to the first one X1 of the driving electrodes (S600), and generating output signals from the plurality of converter circuits 310 and sensing a capacitance value at each of a plurality of node capacitors included in the first one X1 of the driving electrodes (S700) until the voltage levels of the output signals from the plurality of converter circuit units 310 become equal to one another.

That is, the capacitance values of the first capacitors $C_d$ may be adjusted until the voltage levels of the output signals from the plurality of converter circuit units 310 become equal to one another.

As set forth above, according to exemplary embodiments of the present disclosure, linearity and accuracy of touch data can be improved by performing calibration of deviations among integration circuits and calibration of deviations among panel touch nodes.

While exemplary embodiments have been shown and described above, it will be apparent to those skilled in the art that modifications and variations could be made without departing from the spirit and scope of the present disclosure as defined by the appended claims.

What is claimed is:

1. A touchscreen device, comprising:
   panel unit comprising a plurality of node capacitors formed at intersections between a plurality of driving electrodes and a plurality of sensing electrodes;
   a driving circuit unit configured to apply a driving signal to each of the plurality of driving electrodes;
   a sensing circuit unit comprising a plurality of converter circuit units connected to the plurality of sensing electrodes via a switching circuit, and a plurality of panel deviation calibration units, the sensing circuit unit sensing changes in capacitance generated in intersections between the plurality of driving electrodes to which the driving signals are applied and the plurality of sensing electrodes; and
   a control unit configured to:
      control operations of the driving circuit unit and the sensing circuit unit;
      apply a driving signal to a first node capacitor formed at an intersection between a first driving electrode among the plurality of driving electrodes and a first sensing electrode among the plurality of sensing electrodes; and
      calibrate gains of the plurality of converter circuit units so that voltage levels of output signals from the plurality of converter circuit units for the capacitance of the first node capacitor are equal to a predetermined voltage level,
   wherein each of the plurality of panel deviation calibration units is configured to calibrate an output signal from the respective converter circuit unit among the plurality of converter circuit units by using a capacitance value of a first capacitor included in the respective panel deviation calibration unit among the plurality of panel deviation calibration units, in response to the driving signal being applied to the first driving electrode among the driving electrodes, and
   wherein the switching circuit comprises:
      a plurality of first switches connecting or disconnecting signal transfer paths between the plurality of sensing electrodes and the plurality of converter circuit units;
      a calibration switch to which terminals of the plurality of sensing electrodes are connected; and
      a plurality of second switches, each second switch among the second switches having one terminal connected to the respective first switch among the plurality of first switches and having the other terminal connected to the calibration switch.

2. The touchscreen device of claim 1, wherein the control unit is further configured to turn the plurality of first switches off, to turn the calibration switch on, and to turn the plurality of second switches on one by one sequentially, to generate output signals from the plurality of converter circuits to calibrate gains, in response to applying the driving signal to the first node capacitor.

3. The touchscreen device of claim 1, wherein each of the plurality of panel deviation calibration units is further configured to generate an output signal from each of the plurality of converter circuit units using a value obtained by subtracting a capacitance value of the first capacitor from a capacitance value of one node capacitor included in the first driving electrode among the driving electrodes.

4. The touchscreen device of claim 3, wherein the control unit is further configured to adjust the capacitance value of the first capacitor included in each of the plurality of panel deviation calibration units so that the voltage levels of the output signals from each of the plurality of converter circuit units are equal to one another.

5. The touchscreen device of claim 1, wherein each of the plurality of converter circuit units comprises a first integration circuit unit and a second integration circuit unit, wherein the first integration circuit unit comprises a second capacitor charged by a change in capacitance generated in the node capacitor based on the driving signal, and the second integration circuit unit is configured to generate the output signal based on the charges charged in the second capacitor.

6. A method of controlling a touchscreen device, comprising:
   applying a driving signal to a first driving electrode among driving electrodes;
   generating output signals from a plurality of converter circuit units for capacitance of a first node capacitor including a first driving electrode among the driving electrodes via switching operations of a switching circuit;
   calibrating gains of the plurality of converter circuit units so that the voltage levels of the output signals from the plurality of converter circuit units are equal to a predetermined voltage level; and
   sensing capacitance values of a plurality of node capacitors included in the first driving electrode among the driving electrodes, and calibrating using the capacitance values of the plurality of first capacitors so that the voltage levels of the output signals from the plurality of converter circuit units are equal to one another,
   wherein the switching circuit comprises:
      a plurality of first switches connecting or disconnecting signal transfer paths between the plurality of sensing electrodes and the plurality of converter circuit units;
      a calibration switch having one terminal connected to a first sensing electrode among the plurality of sensing electrodes intersecting the first driving electrode among the driving electrodes; and
      a plurality of second switches, each second switch among the second switches having one terminal connected to the respective first switch among the plurality of first switches and having the other terminal connected to the calibration switch.

7. The method of claim 6, wherein the generating of the output signals comprises:
   turning the plurality of first switches off and turning the calibration switch on;
   turning on a second switch among the plurality of second switches located on a signal transfer path to the first sensing electrode among the sensing electrodes so as to generate an output signal from the first converter circuit unit connected to the first sensing electrode among the sensing electrodes; and
   turning on the other second switches among the second switches so as to generate output signals from the plurality of converter circuit units other than the first converter circuit unit.

8. The method of claim 6, wherein the calibrating using the capacitance values of the plurality of first capacitors comprises:

sensing capacitance values of the node capacitors included in the first driving electrode among the driving electrodes sequentially; and subtracting the capacitance values of the plurality of first capacitors from the capacitance values of the node capacitors included in the first driving electrode among the driving electrodes and calibrating deviations of the node capacitors using the subtracted values.

9. A method of controlling a touchscreen device, comprising:

applying a driving signal to a first driving electrode among driving electrodes;

sensing capacitance values of node capacitors included in the first driving electrode among the driving electrodes sequentially;

calibrating using the capacitance values of the plurality of first capacitors so that voltage levels of output signals from a plurality of converter circuit units are equal to one another;

generating output signals from the plurality of converter circuit units for capacitance of the first node capacitor included the first driving electrode among the driving electrodes via switching operations of a switching circuit; and calibrating gains of the plurality of converter circuit units so that the voltage levels of the output signals from the plurality of converter circuit units are equal to a predetermined voltage level, wherein the switching circuit comprises:

a plurality of first switches connecting or disconnecting signal transfer paths between the plurality of sensing electrodes and the plurality of converter circuit units;

a calibration switch having one terminal connected to a first sensing electrode among the plurality of sensing electrodes intersecting the first driving electrode among the driving electrodes; and a plurality of second switches, each second switch among the second switches having one terminal connected to the respective first switch among the plurality of first switches and having the other terminal connected to the calibration switch.

10. The method of claim 9, wherein the generating of the output signals comprises:

turning the plurality of first switches off and turning the calibration switch on;

turning on a second switch among the plurality of second switches located on a signal transfer path to the first sensing electrode among the sensing electrodes so as to generate an output signal from the first converter circuit unit connected to the first sensing electrode among the sensing electrodes; and turning on the other second switches among the second switches so as to generate output signals from the plurality of converter circuit units other than the first converter circuit unit.

11. The method of claim 9, wherein the calibrating using the capacitance values of the plurality of first capacitors comprises calibrating deviations of the plurality of node capacitors using values obtained by subtracting the capacitance values of the plurality of first capacitors from the capacitance values of the plurality of node capacitors included in the first driving electrode among the driving electrodes.

* * * * *